United States Patent
Kimura et al.

[11] Patent Number: 5,944,341
[45] Date of Patent: Aug. 31, 1999

[54] AIR BAG APPARATUS FOR VEHICLE

[75] Inventors: Masato Kimura; Yukisada Sunabashiri, both of Kanagawa-ken, Japan

[73] Assignee: Nissan Motor Co., Ltd., Kanagawa-ken, Japan

[21] Appl. No.: 08/866,383

[22] Filed: May 30, 1997

[30] Foreign Application Priority Data

| May 31, 1996 | [JP] | Japan | 8-139333 |
| May 31, 1996 | [JP] | Japan | 8-161047 |

[51] Int. Cl.⁶ .......................... B60R 21/20; B60R 21/22
[52] U.S. Cl. ........................... 280/728.3; 280/730.2
[58] Field of Search ................. 280/728.2, 728.3, 280/730.1, 730.2, 732

[56] References Cited

U.S. PATENT DOCUMENTS

| 5,538,277 | 7/1996 | Frary et al. | 280/728.2 |
| 5,553,887 | 9/1996 | Karlow et al. | 280/728.3 |
| 5,568,936 | 10/1996 | Spilker et al. | 280/728.2 |
| 5,651,582 | 7/1997 | Nakano | 280/730.2 |

FOREIGN PATENT DOCUMENTS

| 4-50052 | 2/1992 | Japan . | |
| 5-208652 | 8/1993 | Japan | 280/728.3 |
| 2265119 | 9/1993 | United Kingdom | 280/728.3 |

*Primary Examiner*—Peter C. English
*Attorney, Agent, or Firm*—McDermott, Will & Emery

[57] ABSTRACT

An air bag apparatus for a vehicle according to the present invention includes a bracket secured to an arbitrary position of a vehicle and an air bag module attached to the bracket. The air bag module is provided with an inflator for generating gas, an air bag body arranged to be unfolded with gas generated by the inflator, a container and a resin cover. The container has a main opening and sub-openings formed at the two ends of the main opening. The air bag body is accommodated in the container and arranged to be unfolded at the main opening, and the cover has a main cover for covering the main opening of the container and arranged to be split and opened when the air bag body is unfolded and sub-covers for covering the sub-openings of the container. Therefore, a cover having rigidity can be provided for a container which can be molded by extruding.

12 Claims, 7 Drawing Sheets

AIR BAG APPARATUS FOR VEHICLE

BACKGROUND OF THE INVENTION

The present invention relates to an air bag apparatus for a vehicle structured to unfold an air bag when the vehicle encounters a collision to reduce the impact load so as to protect a passenger.

Hitherto, a variety of air bag apparatuses have been suggested as disclosed in, for example, Japanese Patent Laid-Open No. 4-50052 in order to prevent a direct shock which is generated between the side wall of a car body, for example, a door, which is deformed attributable to the impact load and a person who is sitting on a seat if a vehicle encounters a side collision.

In general, an air bag apparatus of the foregoing type has a panel-shape side bracket extending forwards and secured to a seat back frame disposed in an outer portion of a seat back in the widthwise direction of the vehicle. Moreover, an air bag module including an air bag body and an inflator is attached to the side bracket. If a collision of the vehicle takes place, gas generated by the inflator causes the air bag body to be unfolded forwards in front of the seat back so that the passenger is protected by the air bag body.

However, the above-mentioned conventional technology having a simple structure in which the inflator and the air bag body are covered with a cover suffers from unsatisfactory rigidity. Therefore, the cover can easily be dented if the cover is pressed from outside.

In recent years, a structure has been employed in which the inflator and the air bag body are accommodated in a container molded with an extruded metal material and having the same cross sectional shape in the vertical direction. In this case involving the two (vertical) ends of the container being opened, the problem of unsatisfactory rigidity easily rises.

SUMMARY OF THE INVENTION

In view of the foregoing, an object of the present invention is to provide an air bag apparatus for a vehicle having a rigid cover.

In order to achieve the above-mentioned object, according to one aspect of the present invention, there is provided a side impact air bag apparatus for a vehicle comprising: a bracket secured to an arbitrary position of a vehicle; and an air bag module attached to the bracket, wherein the air bag module is provided with an inflator for generating gas, an air bag body arranged to be unfolded with gas generated by the inflator, a container and a resin cover, the container has a main opening and sub-openings formed at the two ends of the main opening, the air bag body is accommodated in the container and arranged to be unfolded through the main opening, and the cover has a main cover for covering the main opening of the container and arranged to be split and opened when the air bag body is unfolded and sub-covers for covering the sub-openings of the container.

Since the above-mentioned structure is formed such that the container has the main opening and sub-openings formed at the two ends of the main opening, the container can be formed by a material having substantially the same cross sectional shape in the vertical direction thereof.

Since the air bag body is accommodated in the container and then the main opening and the sub-opening respectively are covered with the main cover and the sub-cover of the cover, the cover three-dimensionally covers the opening (the main opening and the sub-opening) of the container. Thus, the rigidity of the cover can be improved.

The sub-covers may be attached to the container in such a manner that the sub-covers can easily be separated in a direction in which the cover is opened.

Since the above-mentioned structure is formed such that the sub-cover is attached to the container in such a manner that the sub-cover can easily be separated in the direction in which the cover is opened, the opening operation of the main cover is not inhibited when the air bag body is unfolded.

The container may have a base attached to the bracket and a guide for restricting the direction in which the air bag body is unfolded, the air bag body may be disposed in a space created by the base and the guide in such a manner that the air bag body is unfolded toward the main opening, the sub-covers may be a pair of ribs formed integrally with the main cover, and peripheries of the ribs may be attached to ends of the base in such a manner that the ribs can easily be separated in the direction in which the cover is opened.

Since the above-mentioned structure is formed such that the pair of ribs for covering the sub-openings at the two ends of the container are formed integrally with the cover for the air bag module and the periphery of the rib is attached to the end of the base, the rigidity of the surface of the cover can be improved.

Since also the ribs are made of integrally molded resin, the ribs are expanded to the two ends when the air bag body is unfolded. Thus, excessive rise in the pressure in the internal space can be prevented. Since excessive rise in the pressure in the internal space when the air bag body is unfolded must be prevented, expansion of the resin rib prevents the excessive rise in the pressure. Since the ribs are integrally formed with the cover, the provision of the ribs does not increase the number of the elements of the air bag module.

Each of the ribs may have a cut portion formed at a periphery thereof, the base may have a receiving groove formed at an end thereof, and the cut portion and the receiving groove may be connected to each other by a screw.

Since the above-mentioned structure is formed such that the cut portion formed in the periphery of the rib is attached to the receiving groove formed at the end of the base with the screw, the portion in which the cut portion and the screw are jointed together generates large reaction force (rigidity) against the force for pushing the cover from a side position. However, the cut portion and the screw can easily be separated from each other if force acts in the direction in which the cover is opened.

Each of the ribs may have a hole formed adjacent to the periphery thereof and a thin portion which is formed between the hole and the periphery and which can be cut, the base may have a receiving groove at an end thereof, and the hole and the receiving groove may be connected to each other with a screw.

Since the above-mentioned structure is formed such that the hole formed adjacent to the periphery of the rib is attached to the receiving groove formed at the end of the base with the screw, the portion in which the hole and the screw are joined together generates large reaction force (rigidity) against the force for pushing the cover from a side position. If force acts in a direction in which the cover is opened, the thin portion can easily be cut and separated by the screw.

The base and the guide may be made of extruded materials.

Since the above-mentioned structure is formed such that the base and the guide are formed by extruding, they can easily be formed.

Since the sub-openings formed at the two ends of the container in the extruding direction are covered with the ribs, separation of the air bag body from the sub-openings can be prevented even if the air bag body is disposed between the sub-openings.

The container may be made of an extruded material and has a leading end defining the main opening, the cover may have, at a front end thereof, a tag which is split when the air bag body is unfolded, the tag may be connected to the leading end of the container with joining means, and the leading end of the container may have a shape which is not formed into an edge with respect to the unfolded air bag body and which inhibits projection of the joining means to the air bag body.

Since the above-mentioned structure is formed such that the leading end of the container is not formed into an edge with respect to the unfolded air bag body, the air bag body can reliably be protected. Since the joining means does not project to the air bag body, unfolding of the air bag body cannot be inhibited.

The container may comprises a base which includes the leading end and is attached to the bracket, the joining means may be introduced into the container from a side surface of the leading end of the base which does not face the air bag body to connect the tag to the leading end of the base, and the leading end of the base may have a hollow cross sectional shape including a space having a width larger than the length of introduction of the joining means and having a warped leading end.

Since the above-mentioned structure is formed such that the leading end of the base made of the extruded material is not formed into an edge with respect to the unfolded air bag body, the air bag body can reliably be protected. Since the leading end of the base has a space having the width larger than the length of the introduced portion of the joining means, the introduced portion of the joining means can completely be accommodated in the hollow portion. Therefore, the tags can reliably be attached by the joining means. Moreover, the leading end of the joining means does not project to the air bag body. Thus, unfolding of the air bag body is not inhibited. Since the base is made of the extruded material, the hollow cross section having the warped leading end can easily be formed.

The leading end of the container may have a side surface which does not face the air bag body and which has an expanding groove formed in a direction in which the container is extruded.

Since the above-mentioned structure is formed such that the leading end of the container has the hollow cross sectional shape having the expanding groove formed in the extruding direction, the mold for molding the container by extruding can easily be manufactured as compared with the case where the leading end having the complete hollow portion is formed.

The leading end of the base may have a hollow cross sectional shape forming a smooth inner surface thereof along the direction in which the air bag body is unfolded.

According to the above-mentioned structure since the air bag body is preventing from being caught by the leading end, the air bag body can reliably and stably be unfolded.

DESCRIPTION OF THE PREFERRED EMBODIMENTS

Figure 1:
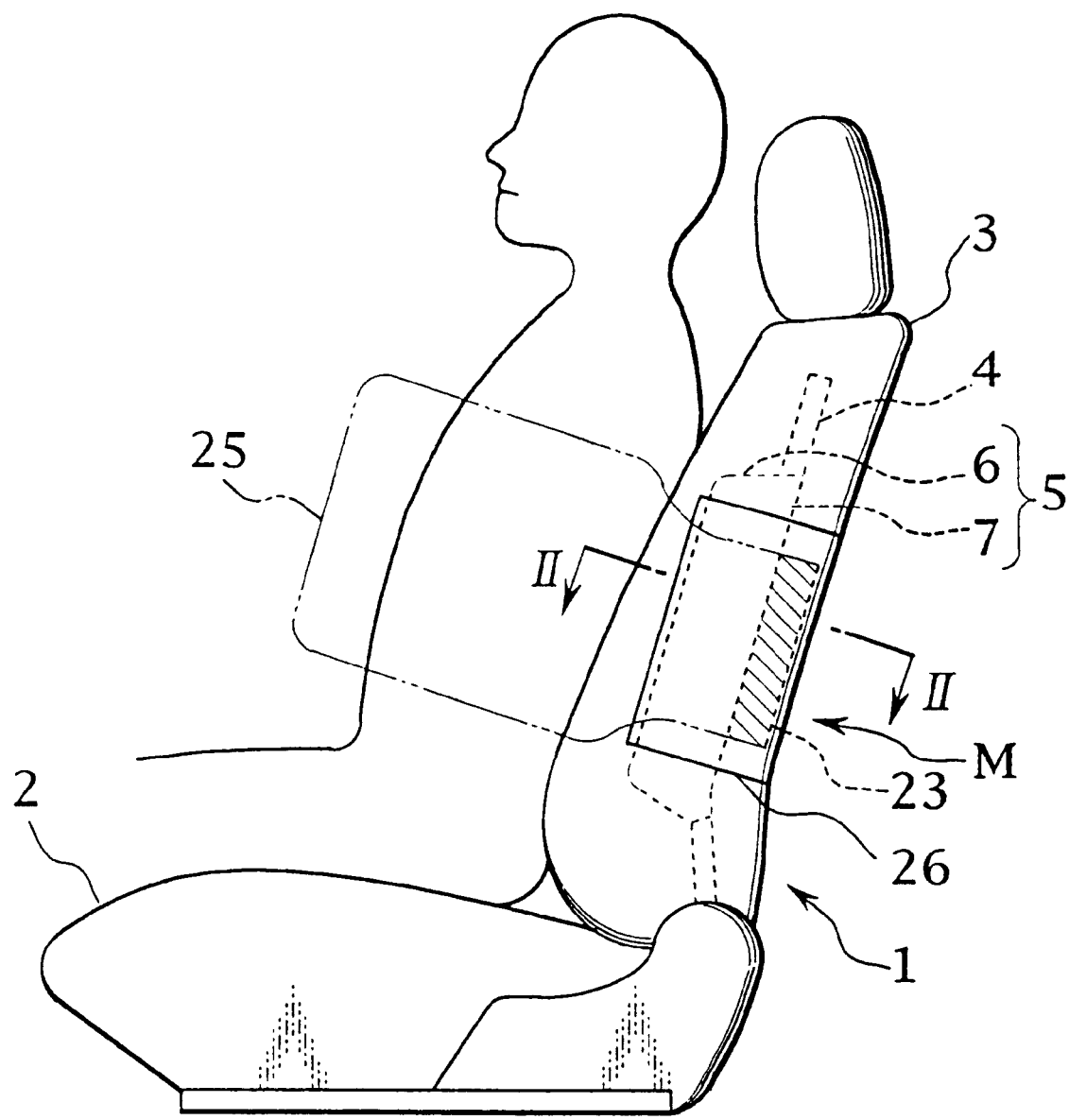
FIG. 1 is a side view of a seat for a vehicle showing an air bag apparatus according to a first embodiment of the present invention.

A preferred embodiment of the present invention will now be described with reference to the drawings. Note that symbols L shown in the drawings indicates the left-hand side (an outer portion in the widthwise direction of the vehicle) and R indicates the right-hand side (an inside portion in the widthwise direction of the vehicle).

FIGS. 1 to 6 are diagrams showing a first embodiment of the present invention. FIG. 1 shows a left-hand front seat 1 of a vehicle consisting of a seat cushion 2 secured to a floor and a seat back 3 permitted to be inclined forwards. The seat back 3 is provided with a pipe-shape seat back frame 4. The overall shape of the seat back frame 4 is formed into a substantially U-shape facing downwards. A vertical portion of the seat back frame 4 is disposed in each of the right-hand portion and the left-hand portion of the seat back 3.

Figure 2:
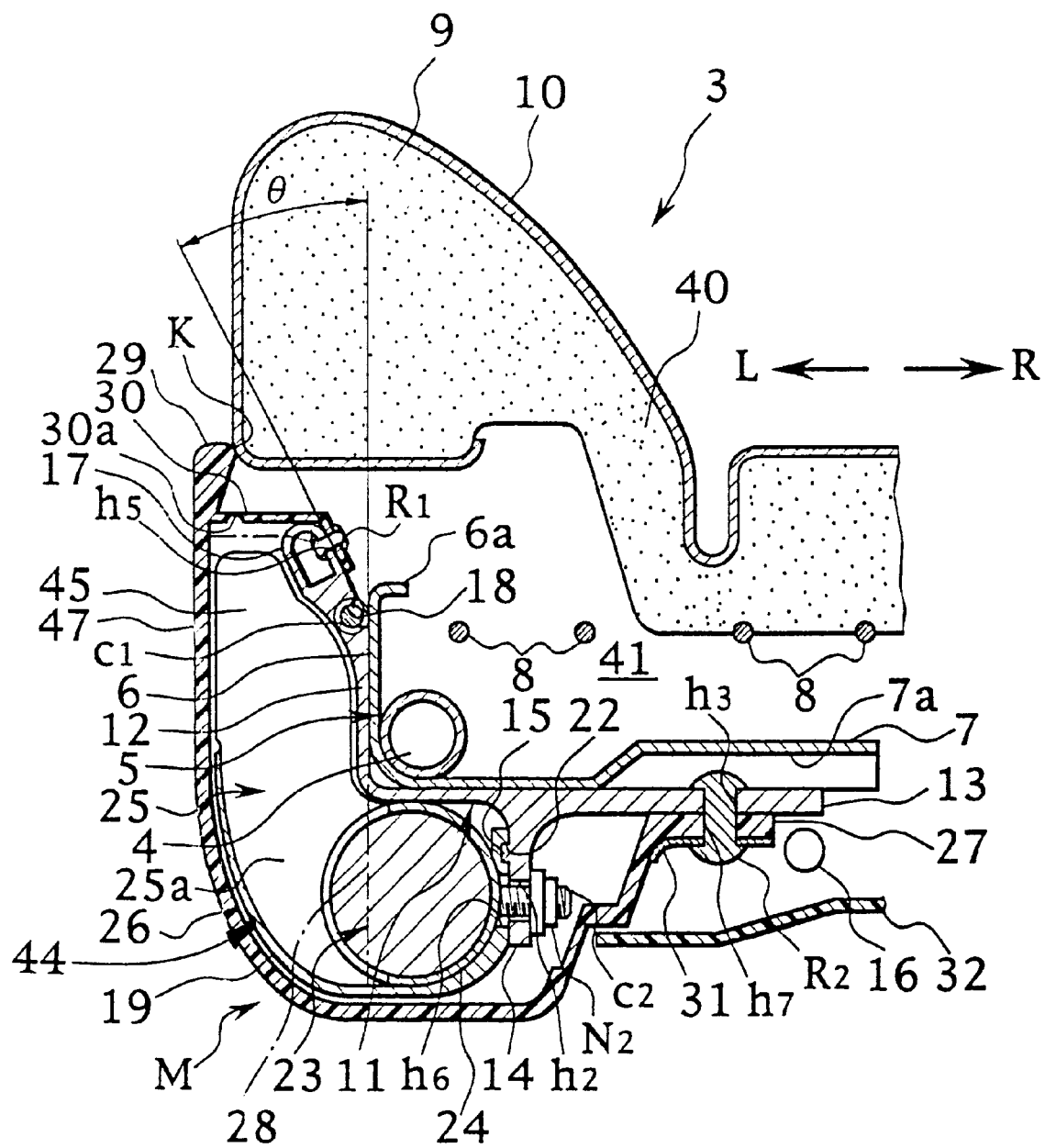
FIG. 2 is a cross sectional view taken along line II—II shown in FIG. 1.
Figure 4:
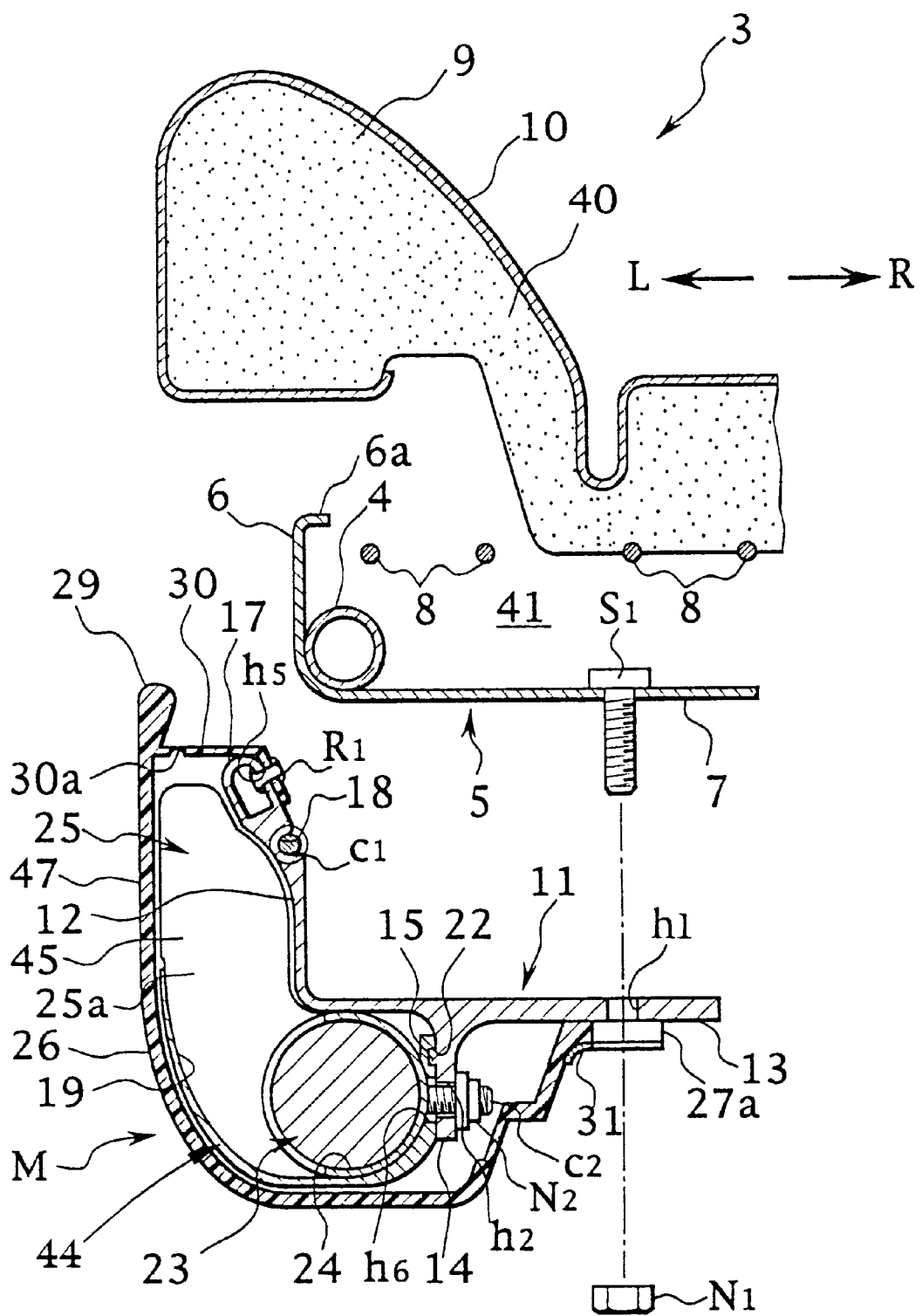
FIG. 4 is a cross sectional view showing a weld bolt portion for illustrating a method of mounting an air bag module.
Figure 5:
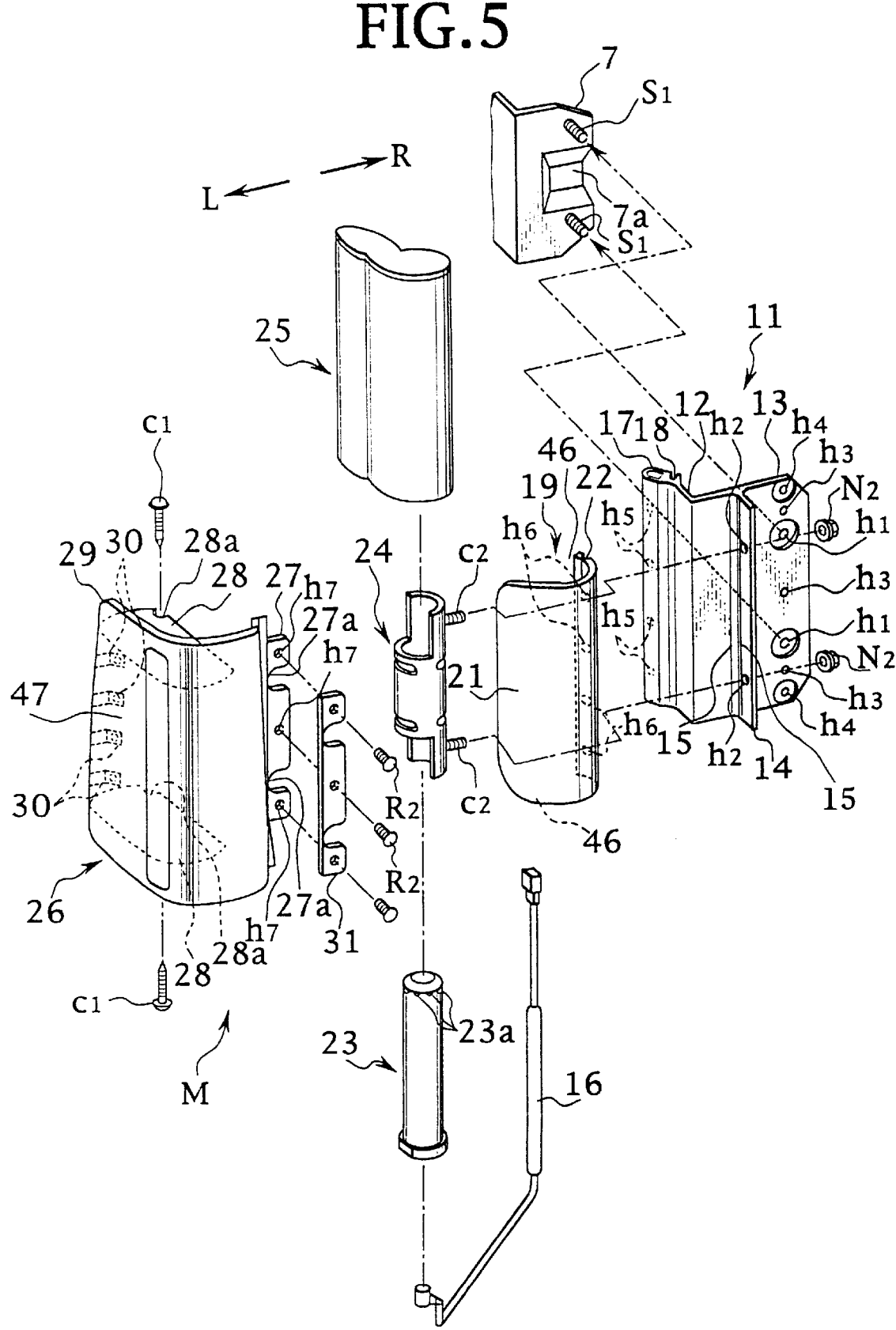
FIG. 5 is an exploded view showing the structure of the air bag module.

As shown in FIG. 2, a side bracket 5 is welded to the left-hand portion (in the outer portion of the widthwise direction of the vehicle) of the seat back frame 4. The side bracket 5 has a substantially L-shape cross section having a side panel 6 extending in the lengthwise direction and a rear panel 7 bent at the rear end of the side panel 6 to extend to the right (to the inner portion in the widthwise direction of the vehicle). The length of the side panel 6 in the lengthwise direction is shorter than the length of the rear panel 7 in the widthwise direction. A bent portion 6a is formed at the leading end of the side panel 6. Two weld bolts S1 are vertically disposed at the right-hand end surface of the rear panel 7, as shown in FIGS. 4 and 5. In the central portion of the rear panel 7, there is formed a recess 7a for preventing interference with a rivet R2 to be described later. Between the right and left brackets 5, there are disposed an S-shape seat spring 8 and a lumbar support mechanism (not shown).

Pads 40 for cushions are provided for the front surface and the side surface of the seat back 3. The pad 40 has a skin 10 provided except for the rear portion. A portion of the pad in the outer portion in the widthwise direction of the vehicle forms a side pad portion 9 projecting more forward than the central portion of the same. The side panel 6 of the side bracket 5 is disposed in the rear of the side pad portion 9.

A region 41 in which the pads 40 and the skin 10 do not exist is provided for a portion of the seat back 3 around the side bracket 5. The side bracket 5 is exposed over the region 41. An air bag module M is attached to the side bracket 5 exposed in the region 41.

The structure of the air bag module M will now be described with reference to FIG. 5.

The air bag module M has a base 11 serving as an element of a container, a guide 19, an inflator 23, an air bag body 25 and a cover 26.

The base 11 is made of an extruded aluminum alloy and has a shape substantially adaptable to the side bracket 5. Since the base 11 is a extruded member, it can easily be used commonly as either the right-hand element or the left-hand element when it is turned upside down.

The base 11 is formed to have a substantially L-shape cross section having a side adaptation portion 12 and a rear adaptation portion 13 and disposed in such a manner that the seat back frame 4 is disposed in the inside portion of the corner of the L-shape portion. The rear adaptation portion 13 is attached to the rear panel 7. The side adaptation portion 12 is in close contact with the side panel 6 in a state where the rear adaptation portion 13 has been attached to the rear panel 7. A rearward projection 14 is formed at an intermediate position of the rear adaptation portion 13. The projection 14 has, on the left-hand surface of the base portion thereof, a projecting portion 15 formed vertically. Two holes h2 are formed vertically adjacent to the projecting portion 15. Two fixing holes h1 corresponding to weld bolts S1 for the side bracket 5 and fixing holes h3 for securing a cover 26 to be described later are formed at the right-hand end of the base 11. Moreover, two clip holes h4 are formed at the right-hand end of the base 11 in addition to the above-mentioned fixing holes h1 and h3. The clip holes h4 are formed to receive inserted fixing clips (not shown) for a harness 16 to be described later.

On the other hand, a leading end 17 of the side adaptation portion 12 of the base 11 is formed in such a manner that a draw and expansion type rivet R1, which is not formed into an edge shape with respect to the unfolded air bag body 25 (to be described later) and which serves as a "joining means" to be described later, does not project to the air bag body 25.

Figure 7:
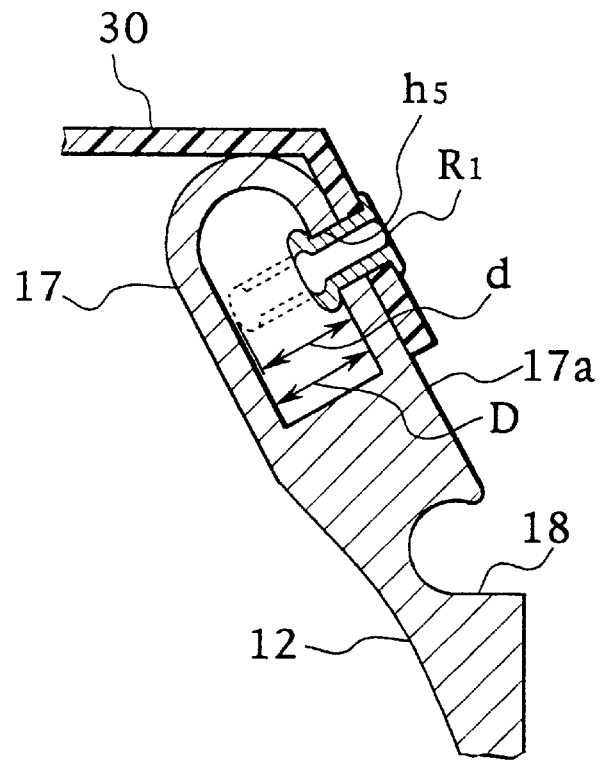
FIG. 7 is an enlarged perspective view showing the leading end of a base.

As specifically shown in FIG. 7, the leading end 17 of the base 11 is formed to have a hollow cross section having a warped leading end and smooth inner surface. The hollow cross sectional shape is made to be a flat shape substantially along the direction in which the air bag body 25 is unfolded. Since the side panel 6 has a short length, the leading end 17 projects more forward than the side panel 6. The width D of the hollow portion in the leading end 17 is made to be larger than the length d of the leading end portion (introduction portion) of the draw and expansion type rivet R1 realized before the rivet R1 is drawn. The leading end 17 has a right side surface (in the inner surface in the widthwise direction of the vehicle) 17a in which four holes h5 are formed by a post process.

The leading end 17 of the side adaptation portion 12 is inclined to the left (to the outside in the widthwise direction of the vehicle) by an angular degree of θ with respect to the side panel 6 of the side bracket 5. The angle θ is set in such a manner that the leading end 17 substantially faces the corner K of the side pad portion 9. A receiving groove 18 for receiving screws C1 to be described later is vertically and continuously formed in the root of the leading end 17. Note that the above-mentioned fixing holes h1 to h5 are formed symmetrically in the vertical direction so as to be commonly used regardless of the right-hand portion or the left-hand portion.

The guide 19 is made of an aluminum alloy and structured to restrict the unfolding direction of the air bag body 25 to the forward direction. The guide 19 is warped to form a substantially U-shape and has a thickness which is gradually reduced from the base thereof to the leading end thereof. The leading end of the guide 19 has the smallest thickness and formed into a straight shape extending forwards. Elongated holes h6 formed in the lengthwise direction to correspond to the hole h2 of the projection 14 is formed in the base portion of the guide 19. A locating groove 22 arranged to be engaged to the projecting portion 15 to locate the positions of the holes h2 and h6 is formed adjacent to the foregoing base portion. Also the guide 19 is formed by extruding molding similarly to the base 11.

The base 11 and the guide 19 are combined with each other so that a container 44 is formed. The container 44 has a main opening 45 formed between the leading end 21 of the guide 19 and the leading end of the side adaptation portion 12 of the base 11 and sub-openings 46 formed at the two ends (at the upper and lower ends shown in FIG. 5) of the main opening 45.

The inflator 23 has a cylindrical shape and stands in the rear of the seat back frame 4. The inflator 23 has gas jetting holes 23a at the top end thereof. A harness 16 is connected to the lower end of the inflator 23, the harness 16 being secured within the clip holes h4 of the base 11 by a clip (not shown) as described above. Note that the inflator 23 is an inflator of a type in which high pressure gas is previously charged.

The inflator 23 is secured to the base 11 in a state where it has been inserted into a housing 24. The housing 24 is formed into a cylindrical shape having upper and lower portions which are half cut, the housing 24 having two bolts C2 projecting over the side surface thereof. The bolts C2 are allowed to pass through the holes h6 of the guide 19, and then inserted into the holes h2 of the projection 14 of the base 11 so as to be secured by lock nuts N2. Since each of the holes h6 has the elongated shape, the inflator 23 can easily be inserted deeply into the guide 19.

The air bag body 25 is folded up and accommodated so as to easily be unfolded. The air bag body 25 surrounds the inflator 23 and the housing 24.

The inflator 23 and the housing 24 accommodated in the air bag body 25 are set to the base portion of the guide 19, and then the bolts C2 of the housing 24 are allowed to pass through the holes h6 of the guide 19. Then, the bolts C2 are inserted into the holes h2 of the projection 14 of the base 11, and then secured by the lock nuts N2. As a result, the air bag body 25, the inflator 23 and the housing 24 are accommodated and attached into the space formed between the guide 19 and the base 11. The air bag body 25 is unfolded with gas generated by the inflator 23 through the main opening 45 of the container 44.

The cover 26 is made of resin and having a main cover 47 formed from the rear surface of the seat back 3 to the side surface of the same to cover the main opening 45 of the container 44 and ribs 28 serving as sub-covers formed to close the sub-openings 46 of the container 44.

The cover 26 has a base 27 in which three fixing holes h7 are formed to correspond to the fixing holes h3. Moreover, the base 27 has cut portions 27a for exposing the fixing holes h1.

Figure 6:
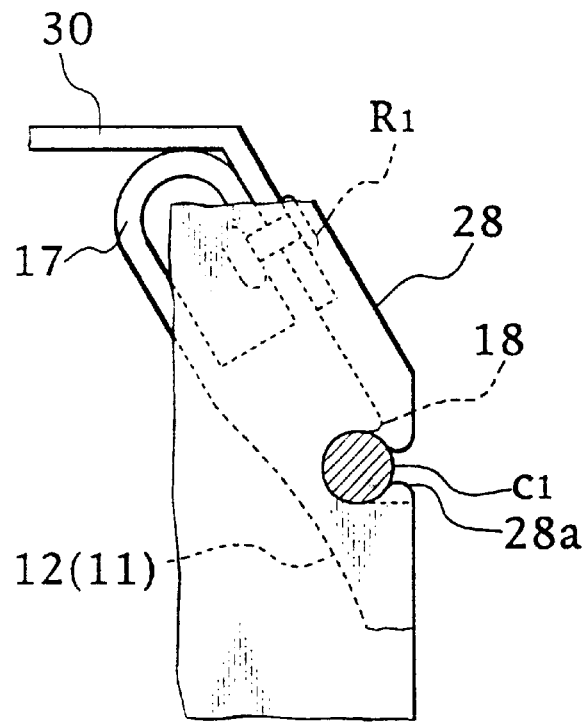
FIG. 6 is an enlarged view showing a portion in which a cut portion and a screw are joined together.

The ribs 28 each having a flat shape are integrally molded at the two ends (the top and lower ends shown in FIG. 5) of the inner surface of the main cover 47. The ribs have shapes capable of covering the air bag body 25 accommodated in the container 44, in particular, the outer surface (the vertical direction shown in FIG. 5) of a folded accommodation portion 25a of the air bag body 25. A cut portion 28a opened on one side thereof to correspond to the receiving groove 18 of the base 11 is formed in the edge portion of each of the ribs 28. It is preferable that the cut portion 28a be formed into a shape having a small opening portion and large inner portion, as shown in FIG. 6. Moreover, four tags 30 are formed in the front end 29 of the cover 26. A notched portion 30a having a small thickness is formed in the inner portion of the root of the tag 30. Since the tags 30 are formed in the front end 29 of the cover 26, they are located in a direction (that is, in the front portion) in which the air bag body 25 is unfolded.

Therefore, the guide 19, the inflator 23, the housing 24 and the air bag body 25 are attached to the base 11, and then the cut portions 28a formed in the ribs 28 provided for the cover 26 are secured to the receiving groove 18 of the base 11 with screws C1. Moreover, the tags 30 are, with rivets R1 serving as the "joining means", secured to holes h5 formed in the leading end 17 of the base 11 such that the rivets R1 are drawn and expanded. Thus, the base 27 is superimposed on the rear adaptation portion 13 and the fixing holes h3 and h7 are aligned to each other. Then, the base 27 and the rear adaptation portion 13 are fixed with rivets R2 through a bracket 31 having the same shape as that of the base 27 of the cover 26. Thus, the air bag module M can be manufactured to serve as a part.

The air bag module M is, from a rear position, attached to the side bracket 5 exposed in the region 41 of the seat back 3 from which the pads 40 and so forth are omitted. That is, the rear adaptation portion 13 and the side adaptation portion 12 of the base 11 of the air bag module M are brought into close contact with the rear panel 7 and the side panel 6 of the side bracket 5. Moreover, the seat back frame 4 is placed in the inner portion of the corner of the base 11, and then the fixing holes h1 of the air bag module M are aligned to the weld bolts S1 of the side bracket 5 so as to be fixed with nuts N1. After the air bag module M has been attached, a trim 32 is finally attached to the rear surface of the seat back 3 with a clipping means (not shown).

In a state where the air bag module M has been attached as described above, the inflator 23 in the air bag module M is placed in the rear of the seat back frame 4 of the side bracket 5 facing the rear panel 7 and only the soft air bag body 25 exists in the portion adjacent to the side panel 6. Therefore, the side portion of the seat back 3 does not project to the wall of the body. That is, even if the air bag body 25 is placed adjacent to the side panel 6, side projection of the air bag module M can satisfactorily be prevented when the air bag body 25 is folded up and accommodated because the air bag body 25 is a soft bag. Since also rearward projection of the air bag module M is limited to only the rear portion of the side portion of the seat back 3, a satisfactory large clearance for a passenger on the rear seat can be maintained.

Figure 3:
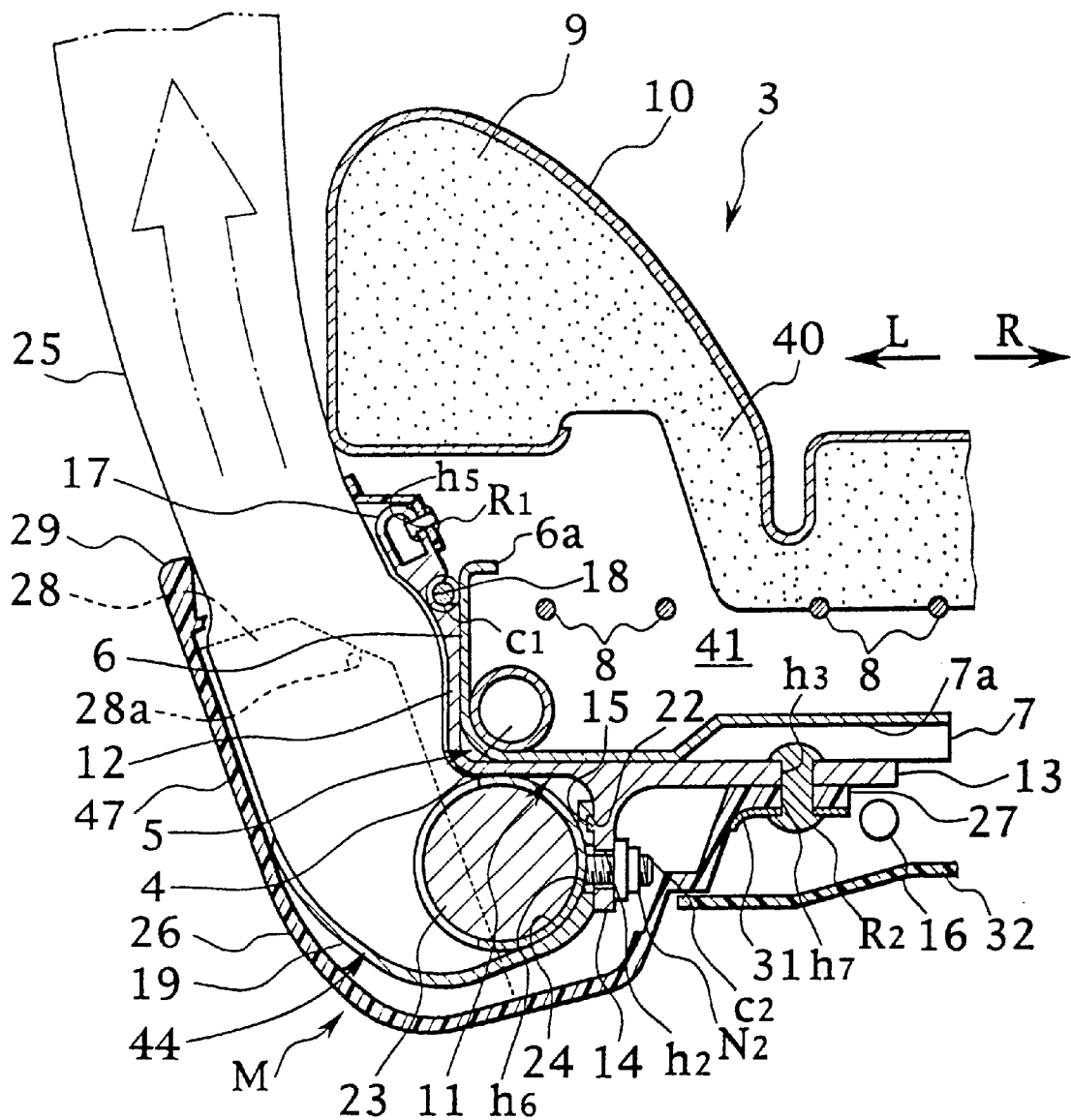
FIG. 3 is a cross sectional view showing a state where the air bag body has been unfolded and corresponding to FIG. 2.

A state for unfolding the air bag body 25 will now be described with reference to FIG. 3.

If a collision of the vehicle takes place, a signal denoting this is supplied to the inflator 23 through the harness 16 so that a large quantity of gas is jetted out from the inflator 23. Since the air bag body 25 is expanded in the cover 26 attributable to the jetted gas, the expanding force of the gas splits the notched portions 30a of the tags 30 in the front end 29 of the cover 26. Since the ribs 28 of the cover 26 are secured by the cut portions 28a and the screws C1, the ribs 28 can easily be separated and thus the front end of the cover 26 is opened. When the cover 26 has been opened, the opened cover 26 and the guide 19 restrict the unfolding direction of the air bag body 25 to only the forward direction. Thus, the air bag body 25 is unfolded and expanded forwards at the side position of the seat back 3. Since the guide 19 is deformed to the left attributable to the unfolding force of the air bag body 25, a space (the internal space of the container 44) between the guide 19 and the base 11 is enlarged. As a result, a space required for the air bag body 25 to be unfolded can be maintained. Hence, the air bag body 25 can reliably be unfolded in the forward direction so that the passenger is protected. Reaction force (reaction force from the inflator 23 to the base 11) generated when unfolding is performed is effectively transmitted to the seat back frame 4 by the base 11 having the substantially L-shape cross section.

Advantages of this embodiment will now be described.

Improvement in the Rigidity of Cover 26

Since the air bag body 25 is accommodated in the container 44 and then the main opening 45 and the sub-opening 46 are covered with the main cover 47 and the ribs 28 of the cover 26, the cover 26 three-dimensionally covers the opening portion (the main opening 45 and the sub-opening 46) of the container 44. As a result, the rigidity of the cover 26 can be improved.

Since the cut portions 28a formed in the periphery of the ribs 28 are attached to the receiving grooves 18 formed at the upper and lower ends of the base 11 with screws C1, large reaction force (rigidity) can be generated against the force for pushing the cover 26 from a side portion.

Reliable Opening of Cover 26

Since the portion in which the cut portions 28a and the screws C1 are joined together can easily be separated in the direction in which the cover 26 is opened, the unfolding force of the air bag body 25 reliably opens the cover 26.

Prevention of Rise in the Pressure in the Internal Space

If the pressure in the container 44 formed by the guide 19 and the base 11 is raised when the air bag body 25 is unfolded, the cover 26 greatly expands in the outward direction and also the ribs 28 are vertically expanded. The rise in the pressure in the container 44 is prevented properly so that the pressure in the container 44 is maintained to a level required for the air bag body 25 to be unfolded.

Improvement in the Rigidity of Base 11

Since the base 11 is made of the extruded metal material, the rigidity can be improved as compared with a metal panel manufactured by press working. Thus, the operation for attaching the rivet R1 can easily be performed.

Easy Manufacturing of Base 11

Since the base having the complicated cross sectional shape having the hollow leading end 17, the projection 14, the receiving groove 18 and the like is molded by extruding, the base 11 can easily be manufactured.

Protection of Air Bag Body 25 from Leading End 17

Since the leading end 17 has the hollow cross sectional shape having the warped leading end, and the smooth inner surface the leading end 17 does not acts as an edged shape. Thus, the air bag body 25 can reliably be protected.

Stable Unfolding of Air Bag Body 25

The leading end of the rivet R1, which is inserted into the hollow portion of the leading end 17, has the length d which is shorter than the width D of the hollow portion so that the leading end of the rivet R1 is completely accommodated in the hollow portion. The tags 30 can reliably be attached with the rivets R1. Moreover, the leading end of the rivet R1 does not project to the air bag body 25 so that the air bag body 25 is protected.

Since the hollow cross sectional shape of the leading end 17 is formed substantially along the direction in which the air bag body 25 is unfolded and thus catching of the air bag body 25 which is unfolded can be prevented, the air bag body 25 can reliably and stably be unfolded.

Other Advantages

The cover 26 having the ribs 28 prevents introduction of foreign matters into the folding accommodation portion 25a of the air bag body 25. Moreover, separation of the folded air bag body 25 can be prevented.

Figure 8:
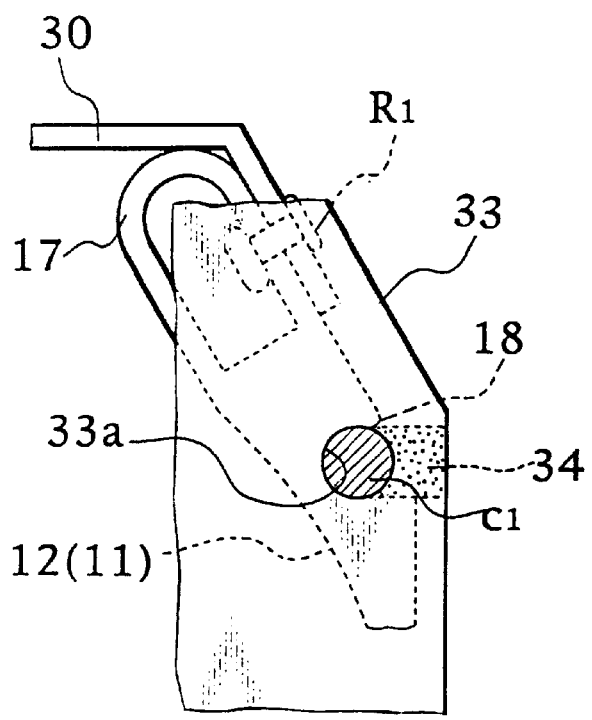
FIG. 8 is an enlarged view showing a portion in which a cut portion and a screw are joined together by a method according to a second embodiment.

FIG. 8 is a diagram showing a second embodiment of the present invention.

In this embodiment, a hole 33a is formed adjacent to the edge of a rib 33, and the hole 33a is attached to the receiving groove 18 of the base 11 with a screw C1. Moreover, a thin portion 34, which can easily be cut, is formed between the hole 33a and the edge of the rib 33. Therefore, the portion in which the hole 33a and the screw C1 are fixed to each other has great reaction force (rigidity) against the force for pushing the cover from a side position, similarly to the foregoing embodiment. However, if force acts in the direction in which the cover is opened, the thin portion 34 can easily be cut and separated by the screw C1. Since the other structures, operations and effects are similar to those according to the above-mentioned embodiment, the common elements are given the same reference numerals and the same elements are omitted from description.

Figure 9:
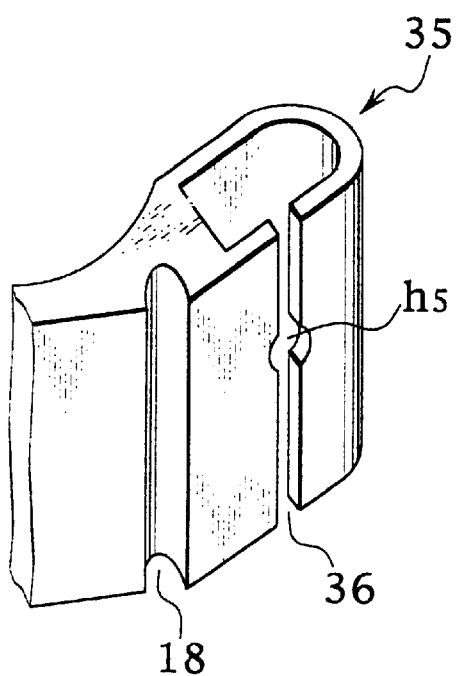
FIG. 9 is an enlarged perspective view showing the leading end of a base according to a third embodiment.

FIG. 9 is a diagram showing a third embodiment of the present invention. In this embodiment, an expanding groove 36 including the hole h5 is vertically and continuously formed by extruding. Since the expanding groove 36 is formed in this embodiment, the leading end 35 does not have a closed cross section. Therefore, a mold for extruding the leading end 35 (the base) can easily be formed as compared with the case where the hollow shape (the closed cross section) according to the above-mentioned embodiment is formed.

In each of the above-mentioned embodiments, the joining means is not limited to the drawing and expansion type rivet R1. It may be a screw or the like.

Although the above-mentioned embodiments have the structure such that the present invention is applied to the seat for a vehicle, the present invention is not limited to this. For example, the present invention may be applied to a variety of air bag apparatuses having an air bag body, the unfolding direction of which must be restricted, for example, an air bag apparatus for a passenger seat.

What is claimed is:

1. An air bag apparatus for a vehicle comprising:
a container secured on a vehicle, the container having a main opening and sub-openings, the sub-openings being formed at opposite ends of the main opening and corresponding to each other;
an inflator for generating gas;
an air bag body being accommodated in the container, the air bag body being unfolded with gas generated by the inflator out from the main opening; and
a resin cover having a main cover for covering the main opening and sub-covers for covering the sub-openings, the main cover being opened by the unfolded air bag body, the sub-covers projected from the main cover and separatably attached to the container, the sub-covers being separated from the container when the main cover is opened.

2. The air bag apparatus for a vehicle according to claim 1, wherein
said container comprises a base attached to a bracket and a guide for restricting the direction in which said air bag body is unfolded,
said air bag body is disposed in a space created by said base and said guide in such a manner that said air bag body is unfolded toward said main opening,
said sub-covers are a pair of ribs formed integrally with said main cover, and
peripheries of said ribs are attached to an end of said base in such a manner that said ribs can easily be separated in the direction in which said cover is opened.

3. The air bag apparatus for a vehicle according to claim 2, wherein
said base and said guide are made of extruded materials.

4. The air bag apparatus for a vehicle according to claim 1, wherein
said container is made of an extruded material and has a leading end defining said main opening,
said cover has a tag at a front end thereof, the tag being split when said air bag body is unfolded,
said tag is connected to the leading end of said container with joining means, and
the leading end of said container has a shape which is not formed into an edge with respect to said unfolded air bag body and which inhibits projection of said joining means to said air bag body.

5. The air bag apparatus for a vehicle according to claim 4, wherein
the leading end of said container has a side surface which does not face said air bag body and which has an expanding groove formed in a direction in which said container is extruded.

6. An air bag apparatus for a vehicle comprising:
a container secured on a vehicle, the container having a main opening and sub-openings, the sub-openings being formed at opposite ends of the main opening and corresponding to each other, the container comprising a base attached to a bracket on the vehicle and a guide held by the base;
an inflator for generating gas;
an air bag body being disposed in a space created by the base and the guide, the air bag body being unfolded with gas generated by the inflator out from the main opening, the base and the guide restricting an unfolding direction of the air bag body toward the main opening; and
a resin cover having a main cover for covering the main opening and a pair of ribs for covering the sub-openings, the main cover being opened by the unfolded air bag body, the ribs formed integrally with and projected from the main cover, each of the ribs having a cut portion formed at a periphery thereof, the base having a receiving groove formed at an end thereof, the receiving groove and each of the cut portions are connected to each other separatably, and the sub-covers being separated from the container when the main cover is opened.

7. The air bag apparatus for a vehicle according to claim 6, wherein each of said cut portions and said receiving groove are connected to each other by a screw.

8. An air bag apparatus for a vehicle comprising:

a container secured on a vehicle, the container having a main opening and sub-openings, the sub-openings being formed at opposite ends of the main opening and corresponding to each other, the container comprising a base attached to a bracket on the vehicle and a guide held by the base;

an inflator for generating gas;

an air bag body being disposed in a space created by the base and the guide, the air bag body being unfolded with gas generated by the inflator out from the main opening, the base and the guide restricting an unfolding direction of the air bag body toward the main opening; and a resin cover having a main cover for covering the main opening and a pair of ribs for covering the sub-openings, the main cover being opened by the unfolded air bag body, the ribs formed integrally with and projected from the main cover, each of the ribs having a hole and a thin portion, the hole being adjacent to a periphery thereof, the thin portion arranged between the hole and the periphery, the base having a receiving groove formed at an end thereof, the receiving groove and each of the holes are connected to each other, and the thin portions being cut and the sub-covers being separated from the container when the main cover is opened.

9. The air bag apparatus for a vehicle according to claim 8, wherein each of said holes and said receiving groove are connected to each other with a screw.

10. An air bag apparatus for a vehicle comprising:

a container secured on a vehicle, the container being made of an extruded material, the container having a main opening and sub-openings, the sub-openings being formed at opposite ends of the main opening and corresponding to each other, the container having a base attached to a bracket on the vehicle, the base having a leading end defining the main opening;

an inflator for generating gas;

an air bag body being accommodated in the container, the air bag body being unfolded with gas generated by the inflator out from the main opening; and a resin cover having a main cover for covering the main opening and sub-covers for covering the sub-openings, the main cover being opened by the unfolded air bag body, the sub-covers projected from the main cover and separatable attached to the container, the sub-covers being separatably from the container when the main cover is opened, the cover having a tag at a front end thereof, the tag being split when said air bag body is unfolded, the tag being connected to the leading end of the base with joining means, the joining means being introduced into the base from a side surface thereof which does not face the air bag body, the leading end of the base having a hollow cross sectional shape including a space having a width larger than the length of introduction of the joining means and having a warped leading end.

11. The air bag apparatus for a vehicle according to claim 10, wherein the leading end of said base has a hollow cross sectional shape forming a smooth inner surface thereof along the direction in which the air bag body is unfolded.

12. An air bag apparatus for a vehicle according to claim 10, wherein the leading end of the base has a side surface which does not face said air bag body and which has an expanding groove formed in a direction in which the base is extruded.

* * * * *